(12) United States Patent
Seyfried

(10) Patent No.: US 8,259,383 B2
(45) Date of Patent: Sep. 4, 2012

(54) BEAM COMBINER AND A LIGHT SOURCE WITH SUCH A BEAM COMBINER

(75) Inventor: Volker Seyfried, Nussloch (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 56 days.

(21) Appl. No.: 12/663,616

(22) PCT Filed: May 6, 2008

(86) PCT No.: PCT/EP2008/055538
§ 371 (c)(1),
(2), (4) Date: Dec. 15, 2009

(87) PCT Pub. No.: WO2008/151884
PCT Pub. Date: Dec. 18, 2008

(65) Prior Publication Data
US 2010/0177375 A1    Jul. 15, 2010

(30) Foreign Application Priority Data
Jun. 15, 2007 (DE) .......................... 10 2007 028 337

(51) Int. Cl.
*G02F 1/33* (2006.01)
*G02B 26/00* (2006.01)
(52) U.S. Cl. .................. 359/305; 359/290; 359/291
(58) Field of Classification Search .................. 359/305, 359/290–292, 298
See application file for complete search history.

(56) References Cited

U.S. PATENT DOCUMENTS
6,967,764 B2 * 11/2005 Birk ............................. 359/305
2001/0028031 A1 10/2001 Engelhardt et al.
2004/0105485 A1 6/2004 Bures et al.
2004/0169134 A1 9/2004 Knebel et al.
2004/0238719 A1 12/2004 Moellmann et al.
2006/0098275 A1 5/2006 Riedmann et al.
2006/0237666 A1 10/2006 Kubo
2007/0070348 A1 3/2007 Seyfried
2008/0304146 A1 12/2008 Knebel

FOREIGN PATENT DOCUMENTS

| | | |
|---|---|---|
| DE | 196 33 185 A1 | 10/1997 |
| DE | 199 06 757 B4 | 12/1999 |
| DE | 102 10 737 A1 | 3/2003 |
| DE | 103 02 259 B3 | 6/2004 |
| DE | 103 37 558 A1 | 3/2005 |
| DE | 10 2004 030 208 B3 | 12/2005 |
| DE | 10 2004 054 262 A1 | 5/2006 |
| DE | 10 2005 046 510 A1 | 4/2007 |
| EP | 0 473 071 B1 | 3/1992 |
| EP | 1 182 445 A2 | 2/2002 |

* cited by examiner

*Primary Examiner* — Thomas K Pham
*Assistant Examiner* — Brandi Thomas
(74) *Attorney, Agent, or Firm* — Foley & Lardner LLP

(57) ABSTRACT

A beam combiner for combining at least two light beams (1, 2) into one combined light beam (3), in particular in the beam path of an optical arrangement, preferably of a microscope, is with respect to a flexible beam combination with structurally simple means characterized by an acousto-optical element (4) in which a mechanical wave or sound wave for deflecting or bending light beams can be generated, so that a first light beam (1) entering the acousto-optical element (4) and at least a second light beam (2) entering the acousto-optical element (4) exit the acousto-optical element (4) in a collinear manner as a combined light beam (3). Further, a light source with such a beam combiner is specified.

17 Claims, 2 Drawing Sheets

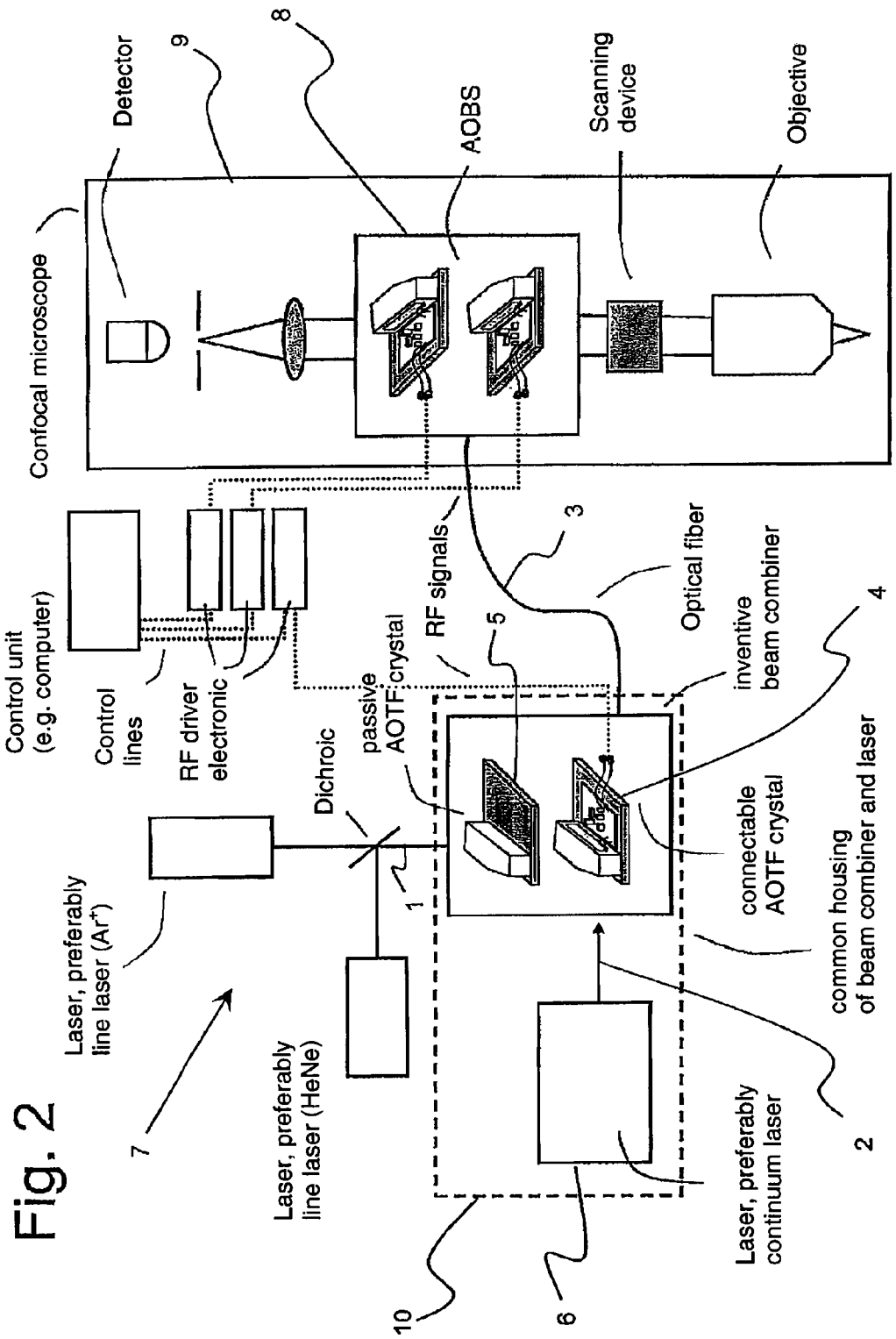

BEAM COMBINER AND A LIGHT SOURCE WITH SUCH A BEAM COMBINER

The invention relates to a beam combiner for combining at least two light beams into a combined light beam, in particular in the beam path of an optical arrangement, preferably of a microscope. Further, the present invention relates to a light source with such a beam combiner.

Beam combiners and light sources of the type mentioned at the beginning are known from practice and are used, for example, in the field of confocal microscopy. In this respect, it is known according to DE 196 33 185 C2 to combine the light beams of two lasers having different wavelengths by means of dichroic beam splitters—color beam splitters. By a sequential arrangement of this setup, three or more laser beams can be combined.

From EP 0 473 071 B1, the combination of light beams via polarization beam splitters is known as well. Further, it is known to the applicant to combine light beams via optical fibers. Moreover, it is known from DE 103 37 558 A1 to perform a spatial spectral splitting of light beams, wherein the combination is performed spatially via a structured, microstructured and/or switchable element, and the light beams are again combined by a dispersive element onto a common beam axis.

In the known beam combiners it is problematic that, for example, the use of color beam splitters results in a power loss of the white light that is mostly costly generated and not powerful anyway. Further, for example, polarization beam splitters cannot be used in light sources having a photonic crystal fiber since the emission light is unpolarized.

In addition, most of the known arrangements do not allow a computer-controlled switching of the characteristic. And in those cases where this is possible, for example in the arrangement known from DE 103 37 558 A1, the switching times are too long in view of present-day requirements.

Finally, in the known arrangements a compact and stable setup can only be realized with difficulties, and the known arrangements are technically relatively complicated, in part uneasy to adjust and very inflexible.

Therefore, the object of the present invention is to design and develop a beam combiner and a light source of the type mentioned at the beginning such that a flexible beam combination with structurally simple means is made possible.

The above object is solved according to the invention by a beam combiner having the features of claim 1. Accordingly, the generic beam combiner is characterized by an acousto-optical element in which a mechanical wave or sound wave can be generated for deflecting or bending light beams in such a manner that a first light beam entering the acousto-optical element and at least one second light beam entering the acousto-optical element exit the acousto-optical element in a collinear manner as a combined light beam.

According to the invention, it has been recognized that it is possible for a beam combination to use an acousto-optical element in which a mechanical wave or sound wave for deflecting or bending light beams can be generated. In doing so, a first light beam entering the acousto-optical element and at least one second light beam entering the acousto-optical element are combined such that they exit the acousto-optical element in a collinear manner as a combined light beam. With the beam combiner according to the invention, for example, a very fast computer-controlled switching of the characteristic is possible. The switching time is in the order of 1 µs. Further, acousto-optical elements can very easily be integrated in optical arrangements due to their mostly modular-like design.

Consequently, with the inventive beam combiner a beam combiner in the form of an AOBM (acousto optical beam merger) is provided in which a flexible beam combination with structurally simple means is made possible, as a result whereof a compact and stable setup can be realized which, in addition, can be very easily adjusted.

Specifically, the first light beam could pass through the acousto-optical element such that the mechanical wave or sound wave does not deflect or bend the first light beam, and the mechanical wave or sound wave could deflect or bend the at least one second light beam such that the first light beam and the at least one second light beam exit the acousto-optical element in a collinear manner as a combined light beam. As a result thereof, a safe combination of the light beams is made possible.

In a particularly simple manner, the acousto-optical element could be an AOTF (acousto optical tunable filter). The acousto-optical element could further have a crystal or an acousto-optical fiber, depending on the requirement.

In a further advantageous manner, the beam combiner could have a compensation element for compensating spatial splittings or chromatic or polarization-dependent aberrations caused by the acousto-optical element.

In a particularly simple and thus advantageous manner the compensation element could be a further acousto-optical element. In this connection, the compensation element could further advantageously be a preferably passive AOTF. Quite general, the compensation element could be a passive crystal that is complementary to the acousto-optical element, as a result whereof a particularly simple design of the beam combiner can be realized.

Alternatively, the compensation element could be a further optical element preferably in the form of a prism or a grid. The selection of the compensation element has to be adapted to the respective application.

For providing a particularly flexible beam combiner, the beam combiner could be designed for combining light beams from a light source with tunable or selectable wavelengths, preferably from an OPO, from a white light laser with selective element or from a dye laser etc., with light beams from a further light source, preferably from a solid state laser, from a diode laser or a gas laser etc.

In the case of light beams from a light source with tunable or selectable wavelengths, for example, in the case of a white light laser, as a selective element an acousto-optical element, preferably an AOTF, could be used, wherein this acousto-optical element could be in a particularly simple manner the acousto-optical element combining the light beams. As a result thereof, the use of a further acousto-optical element—apart from the compensation element which might be designed as an acousto-optical element that serves, for example, for aberration correction, however then does not have to be connected and consequently only acts passively—can be avoided. As a result thereof, costs can be considerably reduced and the control can be considerably simplified.

The inventive beam combiner can particularly advantageously be used in the field of microscopy, in particular in the field of laser scanning microscopy or confocal microscopy. In many cases it is advantageous to arrange a controllable beam splitter, preferably as a main beam splitter of the confocal microscope, downstream of the inventive beam combiner. In this context, an AOBS (acousto optical beam splitter) could be used as a beam splitter.

In such a case, a coordinated or synchronized control of the components can then particularly advantageously be performed. This means above all that the main beam splitter of the confocal microscope is always designed such that the light determined for use by the beam combiner can pass the main beam splitter as unimpeded as possible—or with a defined attenuation. To this end, for example, for many designs of the inventive beam combiner the respective associated optimal setting of the downstream confocal microscope main beam splitter is determined, stored accordingly and used for the later control so that in any situation an optimal coordination of the components can be performed. Of course, the calibration can usually only be made for individual light wavelengths. However, it is easy to achieve the optimal calibration for all wavelengths lying in the range of use by interpolation of the values at some nodes.

The inventive beam combining technology could also be combined with other beam combining technologies, wherein, for example, further beams could be combined with already previously combined beams.

For a further increase in the flexibility of the use of the beam combiner at least one element varying the light intensity, preferably an AOTF, could be arranged upstream and/or downstream of the beam combiner.

With respect to a particularly easily manageable device, the beam combiner could be designed as a module or as a mechanical unit. The beam combiner or such a unit could in a further advantageous manner have further components such as an AOTF or temperature stabilizing means.

With the inventive beam combiner it is advantageously possible to combine with the first light beam not only a second but also a third or further light beam. In the end, a "threading" of several light beams on one another is possible.

In a flexible manner, the first or the second light beam could have light of different wavelengths or light with different spectral portions. For example, the first or the second light beam could be formed of a multi-wavelengths laser, preferably an argon-ion laser, from already combined individual beams, from a white light source or from a tunable laser.

In a further advantageous manner, the white light source or the tunable laser or a tunable light source could have a micro-structured element, a so-called "tapered" fiber, a specially doped fiber, preferably with abnormal dispersion, or a—preferably comparable—element inducing optical non-linearities, wherein light of a laser is coupled into it, from which new wavelengths are generated by non-linear processes. The micro-structured element could preferably have a photonic crystal fiber (PCF), a photonic crystal or a photonic band gap material. By selecting the design of the micro-structured element, thus a simple adaptation to individual requirements is made possible.

If at least one of the wavelengths of one of the light sources is tunable or selectable, a radio frequency could advantageously be adapted to a varied wavelength at the acousto-optical element. During this adaptation, the temperature of the acousto-optical element and/or its surrounding could advantageously also be taken into account so that an optimal adaptation to the radio frequency is made possible.

For cutting out undesired light already in advance, at least one optical filter could be arranged upstream of the beam combiner. In the case of a white light laser, the light concerned is mainly light that has a longer wavelength than the actually desired useful light which, for example, could be cut out by a band edge filter in order to minimize the light load on the acousto-optical components.

In a further advantageous manner, the beam combiner could have a beam trap for collecting the light not intended for use. Such a design is, in particular, important in the case of high light powers since otherwise undesired effects such as damages to components or laser safety problems might occur.

For the realization of a particularly compact arrangement the beam combiner could be arranged in a housing of one of the light sources generating the light beams or of the laser light sources. In this case, the light beam of the other light source or laser light source could preferably be guided by means of an optical fiber into the housing of the one light source or laser light source to the beam combiner so that the combined light of both light sources or laser light sources could jointly exit the housing by a second optical fiber.

The above object is further solved by a light source with a beam combiner, wherein the light source could advantageously have a photonic band gap material.

With respect to the advantages of such a light source reference is made to the above explanations on the advantages of the inventive beam combiner for avoiding repetitions.

With the inventive beam combiner, it is possible to combine several light beams to one joint beam, wherein in particular continuously tunable laser beams, for example, from white light sources, can be combined.

There are now different possibilities of designing and developing the teaching of the present invention in an advantageous manner. With regard thereto, reference is to be made, on the one hand, to the attached claims and, on the other hand, to the following description of an embodiment of the invention with reference to the drawing. In connection with the explanation of the preferred embodiment of the invention with reference to the drawing also generally preferred embodiments and developments of the teaching are explained.

FIG. 2 is a schematic illustration of a typical use of the inventive beam combiner in a confocal microscope.

Figure 1:
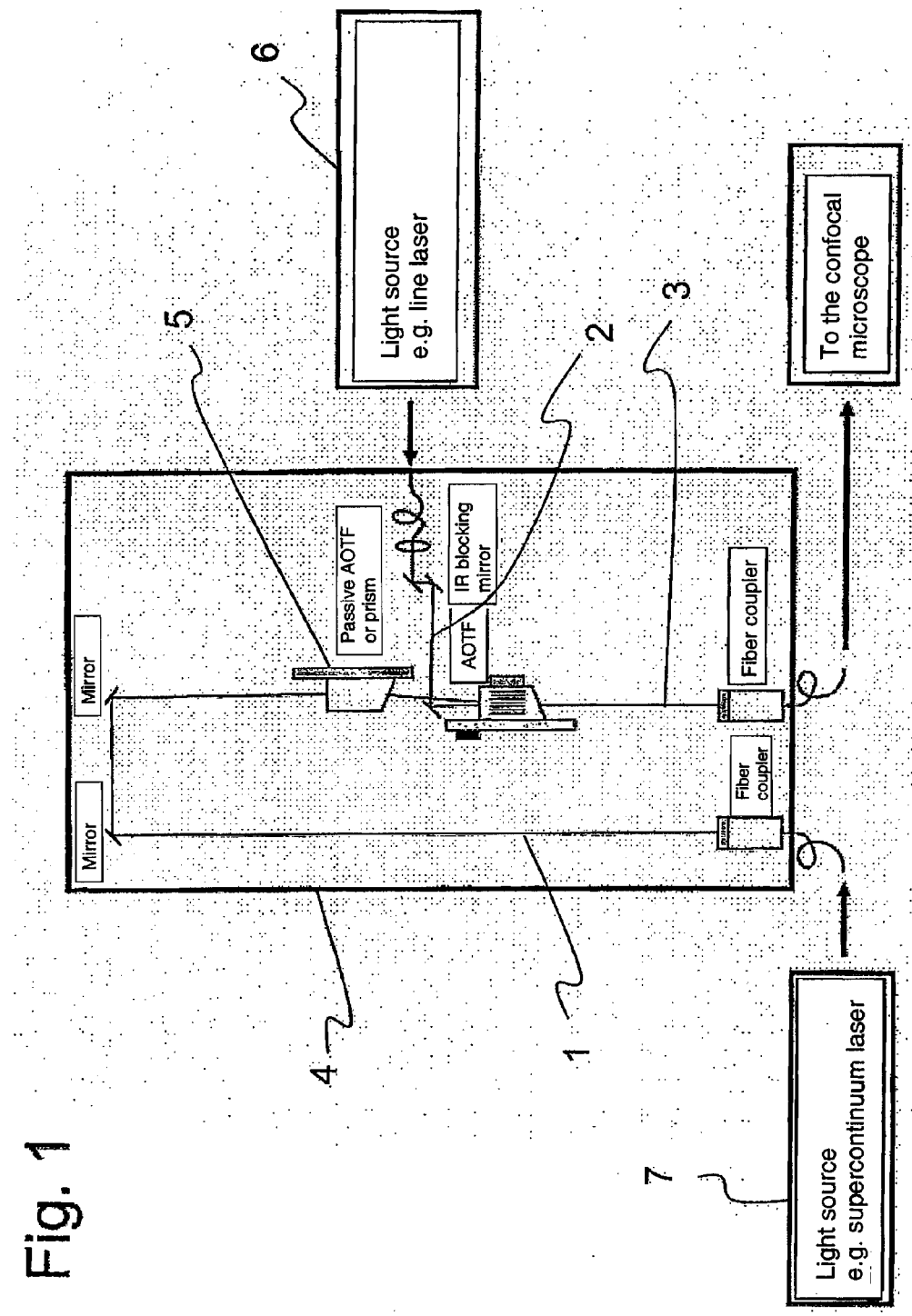
FIG. 1 is a schematic illustration of an embodiment of an inventive beam combiner.

FIG. 1 shows a schematic illustration of an embodiment of an inventive beam combiner for combining at least two light beams 1 and 2 into one combined light beam 3. With respect to a flexible beam combination with structurally simple means, the beam combiner has an acousto-optical element 4 in which a mechanical wave or sound wave for deflecting or bending light beams can be generated in such a manner that a first light beam 1 entering the acousto-optical element 4 and a second light beam 2 entering the acousto-optical element 4 exit the acousto-optical element 4 in a collinear manner as a combined light beam 3.

Specifically, the first light beam 1 can pass through the acousto-optical element 4 such that the mechanical wave or sound wave does not deflect or bend the first light beam 1—at least in part. The mechanical wave or sound wave influences the second light beam 2 however such that the first light beam 1 and the second light beam 2 exit the acousto-optical element 4 in a collinear manner as a combined light beam 3.

In the embodiment illustrated here the acousto-optical element 4 is an AOTF.

For compensating spatial splittings caused by the acousto-optical element 4 or chromatic or polarization-dependent aberrations that are generated by the refraction or double refraction in the crystal of the AOTF, the beam combiner comprises a compensation element 5. This compensation element 5 is designed as a passive AOTF or as a prism.

Further, the beam combiner has various mirrors and fiber couplers for coupling the light sources 6 and 7.

The light source 6 can, for example, be a continuously tunable laser. The light source 7 can be an argon-ion laser.

FIG. 2 shows in a schematic illustration the use of the beam combiner from FIG. 1 in a confocal microscope having a controllable beam splitter 8. The beam splitter 8 serves as a main beam splitter of the confocal microscope 9.

When using the beam combiner a coordinated or synchronized control of the components is realized. This includes that the beam splitter 8 or main beam splitter of the confocal microscope 9 is always designed such that the light determined for use by the beam combiner can pass through the main beam splitter 8 as unimpeded as possible. With regard thereto, for a plurality of designs of the inventive beam combiner, the respective associated optimal setting of the downstream beam splitter 8 is determined, stored accordingly and used for the later control so that in any situation an optimal coordination of the components can take place. The beam combiner is arranged in a housing 10 of the light source 6. The light beam 1 of the other light source 7 is guided into the housing 10 towards the beam combiner. The light beam 1 is a light beam which is comprised of combined individual beams.

With respect to further advantageous embodiments of the inventive teaching reference is made to the general part of the description as well as the enclosed claims for avoiding repetitions.

Finally, it has to be noted that the above described embodiment merely serves to explain the claimed teaching, however does not limit it to this embodiment.

LIST OF REFERENCE SIGNS

1 first light beam
2 second light beam
3 combined light beam
4 acousto-optical element
5 compensation element
6 light source
7 light source
8 beam splitter
9 confocal microscope
10 housing

The invention claimed is:

1. A beam combiner for combining a first light beam and a second light beam into a combined light beam, comprising:
   an acousto-optical element configured to generate a mechanical wave or a sound wave to deflect or bend at least one of the first and second light beams,
   wherein the first or the second light beam includes light of different wavelengths or light with different spectral portions, and
   wherein the first light beam enters the acousto-optical element and the second light beam enters the acousto-optical element and the first and second light beams exit the acousto-optical element in a collinear manner as a combined light beam.

2. The beam combiner according to claim 1, wherein the first light beam is configured to pass through the acousto-optical element such that the mechanical wave or the sound wave does not deflect or bend the first light beam and wherein the mechanical wave or the sound wave deflects or bends the second light beam such that the first light beam and the second light beam exit the acousto-optical element in a collinear manner as a combined light beam.

3. The beam combiner according to claim 1, wherein the acousto-optical element is an AOTF (acousto optical tunable filter).

4. The beam combiner according to claim 1, wherein the beam combiner further comprises a compensation element configured to compensate spatial splittings or chromatic or polarization-dependent aberrations caused by the acousto-optical element.

5. The beam combiner according to claim 4, wherein the compensation element is a further acousto-optical element.

6. The beam combiner according to claim 4, wherein the compensation element is a passive AOTF.

7. The beam combiner according to claim 1, wherein the beam combiner is designed to combine one of the first and second light beams from a light source with tunable or selectable wavelengths with the other of the first and second light beams from a further light source.

8. The beam combiner according to claim 7, wherein the acousto-optical element is a selective element for the one of the first and second light beams from the light source with tunable or selectable wavelengths.

9. The beam combiner according to claim 1, wherein a controllable beam splitter is arranged downstream of the beam combiner.

10. The beam combiner according to claim 1, wherein upstream or downstream of the beam combiner at least one element to vary the light intensity is arranged.

11. The beam combiner according to claim 1, wherein the beam combiner further comprises a temperature stabilizer.

12. The beam combiner according to claim 1, wherein the beam combiner is arranged in a housing of a light source that generates the first or second light beam.

13. A light source with a beam combiner according to claim 1.

14. The beam combiner according to claim 7, wherein the light source with tunable or selectable wavelengths is an OPO, a white laser with a selective element, or a dye laser, and wherein the further light source is a solid state laser, a diode laser, or a gas laser.

15. The beam combiner according to claim 1, wherein the beam combiner is arranged in a confocal laser scanning microscope.

16. The beam combiner according to claim 1, wherein the first and the second light beams are separate prior to entering the acousto-optical element.

17. A beam combiner for combining a first light beam and a second light beam into a combined light beam, comprising:
   an acousto-optical element configured to generate a mechanical wave or a sound wave to deflect or bend at least one of the first and second light beams,
   wherein the first light beam emanates from a first light source and the second light beam emanates from a second light source, and the first and second light sources have different output spectrums, and
   wherein the first light beam enters the acousto-optical element and the second light beam enters the acousto-optical element and the first and second light beams exit the acousto-optical element in a collinear manner as a combined light beam.

* * * * *